United States Patent
Hou

(10) Patent No.: US 8,310,110 B2
(45) Date of Patent: Nov. 13, 2012

(54) POWER SWITCH CIRCUIT

(75) Inventor: Chuan-Tsai Hou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 282 days.

(21) Appl. No.: 12/848,100

(22) Filed: Jul. 31, 2010

(65) Prior Publication Data

US 2011/0234294 A1 Sep. 29, 2011

(30) Foreign Application Priority Data

Mar. 26, 2010 (CN) .......................... 2010 1 0133269

(51) Int. Cl.
*B23K 11/24* (2006.01)
*H02B 1/24* (2006.01)
(52) U.S. Cl. ......................................... 307/112; 307/80
(58) Field of Classification Search .................. 307/43, 307/64, 80, 112, 115; 327/365; 713/300
See application file for complete search history.

(56) References Cited

U.S. PATENT DOCUMENTS 7,511,390 B1 * 3/2009 Walter ........................... 307/112
7,535,123 B2 * 5/2009 Formenti et al. ................ 307/80

* cited by examiner

*Primary Examiner* — Carlos Amaya
(74) *Attorney, Agent, or Firm* — Altis Law Group, Inc.

(57) ABSTRACT

A power switch circuit includes first and second power switches, first to fourth inverters, first and second diodes. An input of the first inverter is connected to a first positive terminal of the first power switch. An input of the second inverter is connected to an output of the first inverter. A cathode of the first diode is connected to an output of the second inverter. An anode of the first diode is connected to a power-on terminal of a motherboard. An input of the third inverter is connected to a second positive terminal of the second power switch. An input of the fourth inverter is connected to an output of the third inverter. A cathode of the second diode is connected to an output of the fourth inverter. An anode of the second diode is connected to the power-on terminal.

3 Claims, 1 Drawing Sheet

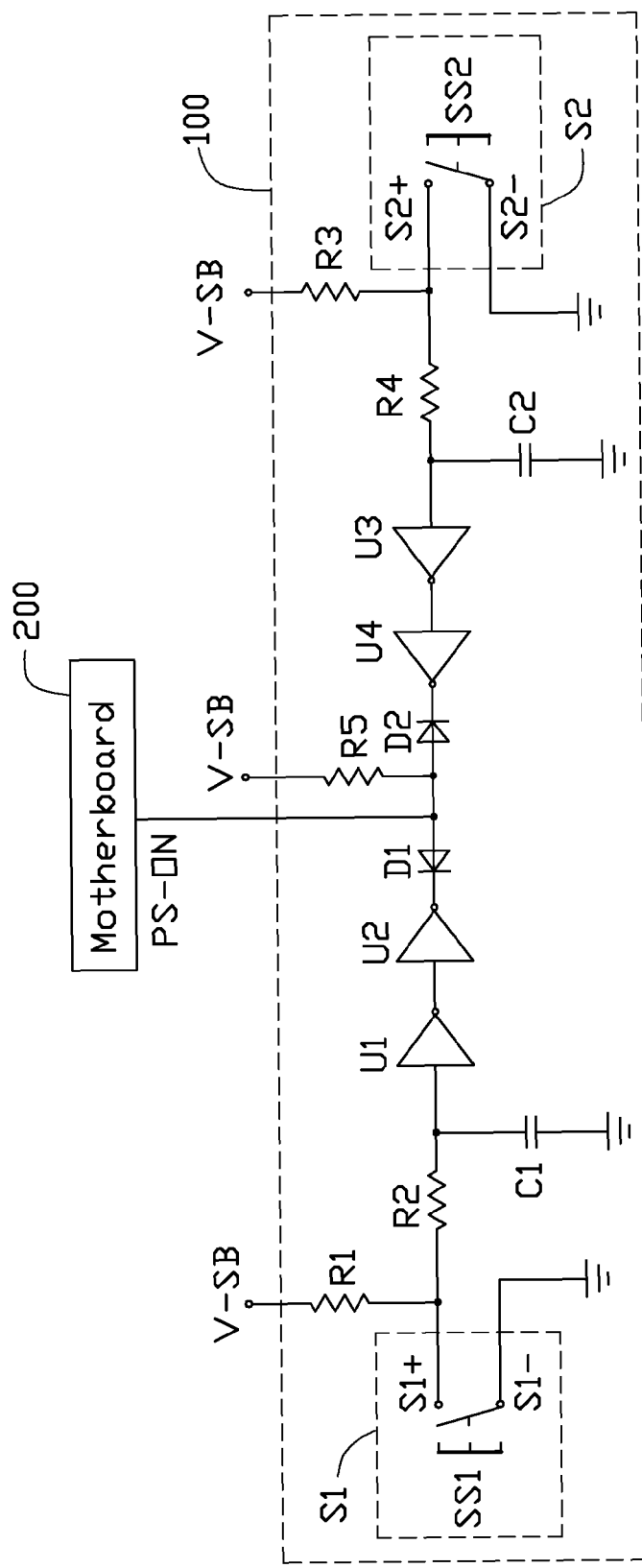

POWER SWITCH CIRCUIT

BACKGROUND

1. Technical Field

The present disclosure relates to a power switch circuit.

2. Description of Related Art

In a computer with a motherboard and a plurality of daughterboards, the crucial components of the computer, such as a processor, are set on the motherboard. The extension components of the computer, such as a sound card, are set on the daughterboards. A computer with a motherboard and a plurality of daughterboards has two power switches. The two power switches are both connected to the power-on terminal of the motherboard. When the two power switches are turned on, the power-on terminal of the motherboard receives two low voltage signals. Thus, the computer is powered on. However, when one of the power switches is turned on and the other is turned off, the voltage of the power-on terminal is between the high voltage level and the low voltage level. The computer may not power-on.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The FIGURE is a circuit diagram of an exemplary embodiment of a power switch circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the drawing, an exemplary embodiment of a power switch circuit 100 includes a first power switch S1, a second power switch S2, four inverters U1-U4, two diodes D1 and D2, resistors R1-R5, and capacitors C1 and C2.

The first power switch S1 includes a key SS1, a positive terminal S1+, and a negative terminal S1−. The positive terminal S1+ of the first power switch S1 is connected to a standby power source V-SB through the resistor R1. The negative terminal S1− of the first power switch S1 is grounded. The positive terminal S1+ contacts the negative terminal S1− when the key SS1 is pressed.

An input of the inverter U1 is connected to the positive terminal S1+ of the first power switch S1 through the resistor R2. The input of the inverter U1 is also grounded through the capacitor C1. An output of the inverter U1 is connected to an input of the inverter U2. An output of the inverter U2 is connected to a cathode of the diode D1. An anode of the diode D1 is connected to a power-on terminal PS-ON of a motherboard 200 of a computer. The inverters U1 and U2 are used to convert the voltage of the positive terminal S1+ to a corresponding standard high voltage or low voltage.

The second power switch S2 includes a key SS2, a positive terminal S2+, and a negative terminal S2−. The positive terminal S2+ of the second power switch S2 is connected to the standby power source V-SB through the resistor R3. The negative terminal S2− of the second power switch S2 is grounded. The positive terminal S2+ contacts the negative terminal S2− when the key SS2 is pressed.

An input of the inverter U3 is connected to the positive terminal S2+ of the second power switch S2 through the resistor R4. The input of the inverter U3 is also grounded through the capacitor C2. An output of the inverter U3 is connected to an input of the inverter U4. An output of the inverter U4 is connected to a cathode of the diode D2. An anode of the diode D2 is connected to the power-on terminal PS-ON of the motherboard 200. The inverters U3 and U4 are used to convert the voltage of the positive terminal S2+ to a corresponding standard high voltage or low voltage.

A first terminal of the resistor R5 is connected to the anode of the diode D2. A second terminal of the resistor R5 is connected to the standby power source V-SB.

When the key SS1 of the first power switch S1 and the key SS2 of the second power switch S2 are not pressed, the positive terminal S1+ does not contact the negative terminal S1−, and the positive terminal S2+ does not contact the negative terminal S2−. The positive terminal S1+ and the positive terminal S2+ are both at high voltage level. The diodes D1 and D2 are turned off. Because the power-on terminal PS-ON is connected to the standby power source V-SB through the resistor R5, the power-on terminal PS-ON is at a high voltage level. The computer does not power on.

When the key SS1 of the first power switch S1 is pressed and the key SS2 of the second power switch S2 is not pressed, the positive terminal S1+ contacts the negative terminal S1−, and the positive terminal S2+ does not contact the negative terminal S2−. The positive terminal S1+ is at a low voltage level and the positive terminal S2+ is at a high voltage level. The diode D1 is turned on and the diode D2 is turned off. The anode of the diode D1 is at a low voltage level. Therefore, the power-on terminal PS-ON is at a low voltage level. The computer powers on.

The computer is also powered on when the key SS1 of the first power switch S1 is not pressed and the key SS2 of the second power switch S2 is pressed.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power switch circuit, comprising:
   a first power switch comprising a first key, a first positive terminal, and a first negative terminal, wherein the first positive terminal is connected to a standby power source through a first resistor, the first negative terminal is grounded, the first positive terminal contacts the first negative terminal when the first key is pressed;
   a first inverter, wherein an input of the first inverter is connected to the first positive terminal of the first power switch through a second resistor;

a second inverter, wherein an input of the second inverter is connected to an output of the first inverter;

a first diode, wherein a cathode of the first diode is connected to an output of the second inverter, an anode of the first diode is connected to a power-on terminal of a motherboard;

a second power switch comprising a second key, a second positive terminal, and a second negative terminal, wherein the second positive terminal is connected to the standby power source through a third resistor, the second negative terminal is grounded, the second positive terminal contacts the second negative terminal when the second key is pressed;

a third inverter, wherein an input of the third inverter is connected to the second positive terminal of the second power switch through a fourth resistor;

a fourth inverter, wherein an input of the fourth inverter is connected to an output of the third inverter;

a second diode, wherein a cathode of the second diode is connected to an output of the fourth inverter, an anode of the second diode is connected to the power-on terminal of the motherboard; and a fifth resistor, wherein a first terminal of the fifth resistor is connected to the anode of the second diode, a second terminal of the fifth resistor is connected to the standby power source.

2. The power switch circuit of claim 1, wherein the input of the first inverter is grounded through a capacitor.

3. The power switch circuit of claim 1, wherein the input of the third inverter is grounded through a capacitor.

* * * * *